UNITED STATES PATENT OFFICE.

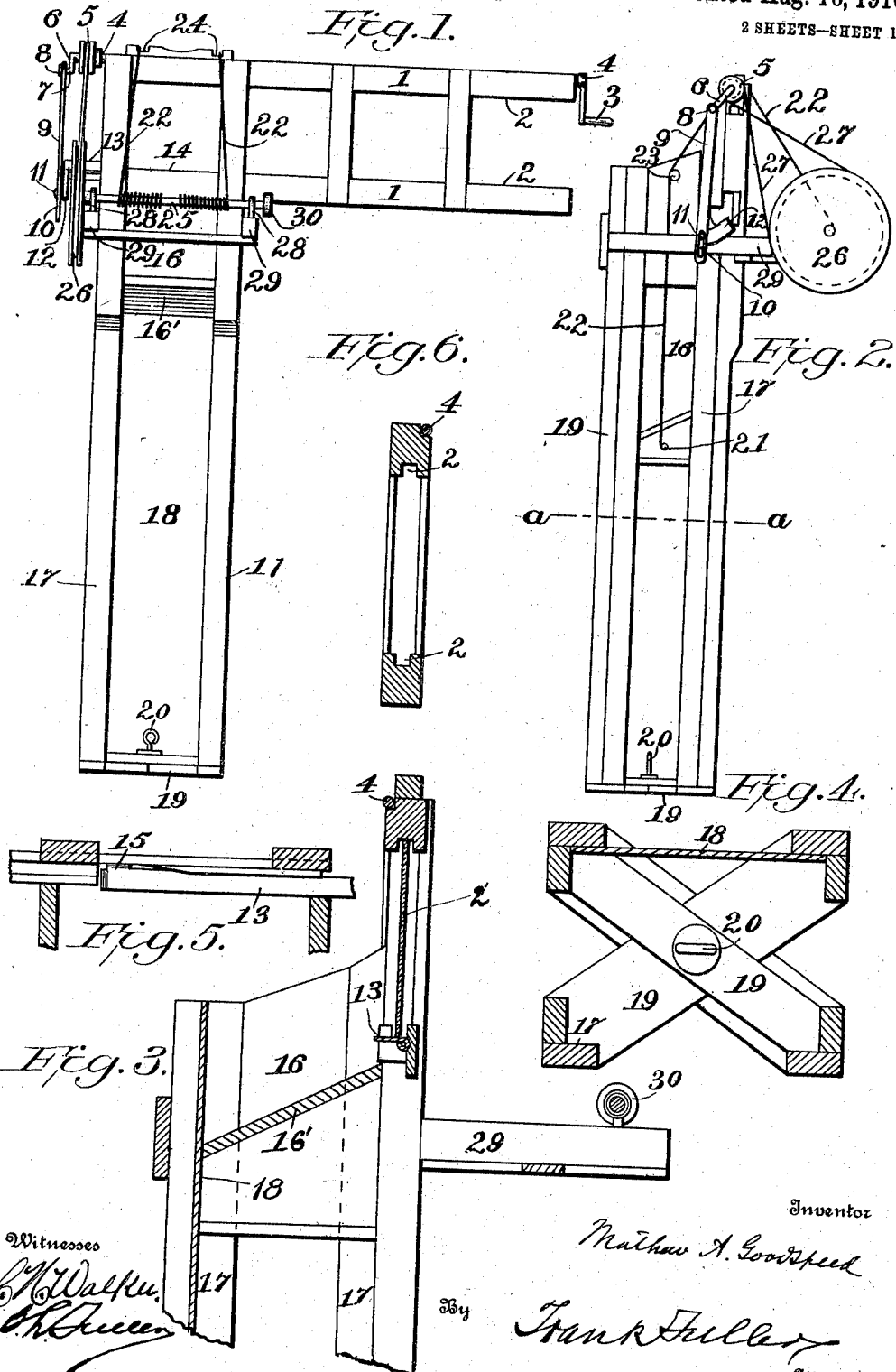

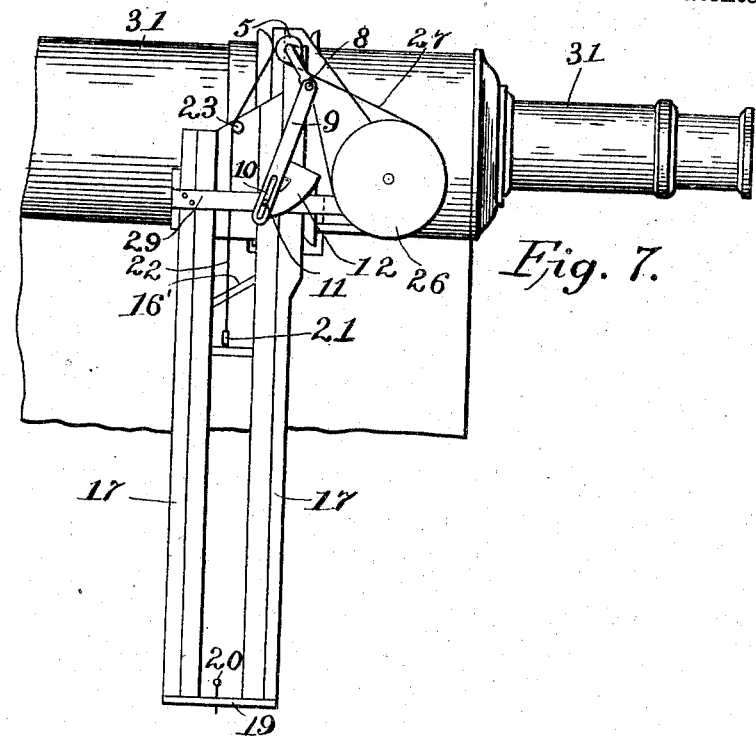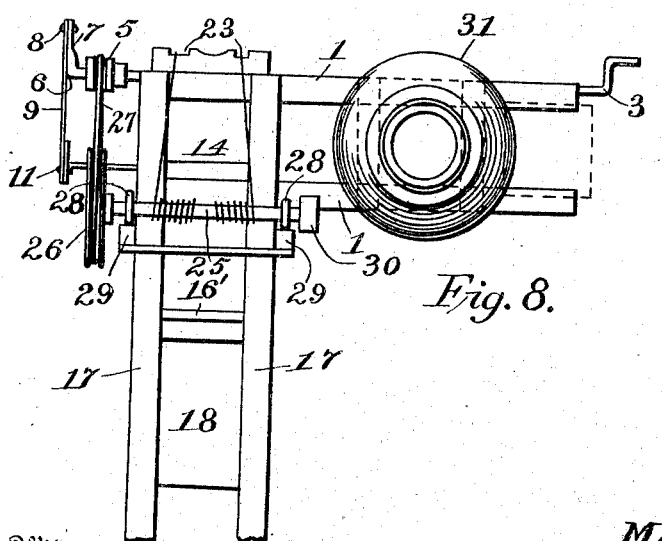

MATHEW A. GOODSPEED, OF FREMONT, NEBRASKA.

SLIDE-CARRIER FOR STEREOPTICONS.

967,511.

Specification of Letters Patent. Patented Aug. 16, 1910.

Application filed May 15, 1909. Serial No. 496,296.

*To all whom it may concern:*

Be it known that I, MATHEW A. GOODSPEED, citizen of the United States, residing at Fremont, in the county of Dodge and State of Nebraska, have invented certain new and useful Improvements in Slide-Carriers for Stereopticons, of which the following is a specification.

My invention relates to new and useful improvements in slide carriers for stereopticons and other picture projecting devices, and the objects are to provide a slide carrier of simple construction, easy of operation and capable of containing a number of slides simultaneously; and also the rapid movement of the slide from its position before the lens and the immediate substitution of another with but one movement of the operator; and further to provide an automatic slide release or dump, discharging the slide instantaneously after using; and also a movable receiving box or magazine, adapted to immediately receive slides as discharged from the release. With these objects in view, and others which will appear from the specifications and claims herein set forth, reference being had to the accompanying drawings, which form a part of these specifications, wherein like letters refer to corresponding parts and in which—

Figure 1, is a rear view of my improved carrier. Fig. 2, is a side elevation of the same. Fig. 3, is a sectional view of the slide release and receiving magazine. Fig. 4, is a sectional view of the magazine frame, looking from above on a line *a—a* of Fig. 2. Fig. 5, is a detail view showing the slide release. Fig. 6, is a sectional end view of the slide case. Fig. 7 is a side view of a lens-tube of a picture projecting device with my invention applied thereto. Fig. 8, is an end view of the same, looking at the front of the machine.

Referring specifically to the drawings, 1, denotes a slide carrier mounted at one end on a perpendicular frame, as hereinafter detailed, and designed and adapted to be inserted crosswise in the lens tube of a stereopticon or other picture projecting device, at the place where slide carriers are usually interposed. It has a grooved passage way 2, and space therein for four slides, end to end as shown at 2′.

3 is a cranked arm, attached to the end of revoluble shaft 4, which is horizontally mounted in eye screws distributed along the upper portion of the slide carrier, and in which it revolves. This shaft 4, near the other end, is provided with a grooved pulley 5, abutting the end of the slide carrier, and terminating in an elbow 6 and arm 7, extending outwardly at right angles with the main shaft. To arm 7, is pivoted, at 8, a perpendicular reciprocating bar 9, the other end of which is provided with an inclosed slot 10, adapted to engage a pin 11, on arm 12 of the slide release.

13 is a slide release and is a narrow plate, extending across the bottom of the last section at 14, of the slide carrier, and is fastened to the lower portion of the slide carrier by suitable hinges 15, (only one shown). At the end of the release extending beyond the frame is provided a projecting curved arm, 12, on which is a pin 11, adapted to engage the slot in the reciprocating rod 9, in its upward or downward movement, elevating or lowering the release 13, corresponding with the movement of the rod, and thus releasing or confining the slide on view at the will of the operator. As the slide is released by the downward movement of the release 13, it drops into receiving magazine 16, which is provided with an inclined bottom, 16′, causing the slide to slip into place as it strikes, one above the other, until the magazine is full.

17 is a rectangular, upright frame composed of four triangular, grooved posts, on which slide carrier 1, is mounted, at one end, held in position by ordinary screws and bolts. Magazine 16 is slidably mounted on the interior of frame 17, ascending or descending as manipulated by the operator. The rear of frame 17 is provided with a suitable lining 18, preferably of light wood material, extending nearly the entire length of the frame, forming a convenient passageway for the magazine 16. The four corners of frame 17 are braced at the bottom by cross bars 19—19, through the center of which is inserted in a suitable opening, a screw 20, for fastening the frame to the operating table. Magazine box 16 is provided centrally on each side with eye screws 21—21, to which are attached cords 22—22, which pass upwardly through a like set of eye screws, 23, on each side of the frame, and continuing over the top of the frame and slide carrier 1, in suitable grooves 24—24, downwardly to revolving shaft 25, around which these cords wind when the mechanism of the crank arm 3 is actuated. Shaft 25 is mounted in eye screws 28—28 on two cross beams 29—29 extending backward from frame 17, and is provided with a pulley 26, operating in connection with grooved pulley 5, which serves to drive pulley 26 by means of cord 27 when the mechanism is in operation. At the opposite end, shaft 25 is provided with a guard wheel 30 retaining the shaft in position in the eye screws 28—28.

31 denotes the lens tube of an ordinary picture projecting device, which for convenience of illustration, is adjusted to the second section of the slide carrier, but it is more suitably adjustable to the third section from the end of insertion of the slides.

Having described my invention in detail, the operation thereof is as follows;—a convenient number of slides, are placed in slide carrier 1, in the order to be exhibited, the one to be shown first being inserted first, they then follow in consecutive order. By manipulation of crank arm 3, slide release 13 is adjusted to an elevated position engaging the lower edge of the slide immediately in front of the lens tube, holding it firmly in place at the will of the operator. When ready to disengage turn the arm 3; this movement revolves shaft 4 and grooved pulley thereon, 5, and by means of cord 27 operates pulley 26, and at the same time elbow 6 and arm 7. This operation sets shaft 9 in motion, causing slot 10 therein to engage pin 11 on the arm 12 attached to release 13, causing the release to drop, discharging the used slide into receiving magazine 16, and as the slide strikes the inclined bottom, 16′, in the magazine, it falls into place carried by the momentum received at the release. The cord 27 on grooved pulley 5, serves to drive grooved pulley 26, on shaft 25, unwinding cords 22—22, attached to the receiving magazine 16, which descends the shaft 17 sufficiently to accommodate the succeeding slides, immediately after using. The pulleys 5 and 26 being so adjusted with the crank arm 3 mechanism, as to permit the receiving magazine 16 to descend the shaft 17, the space of the thickness of the slide used. As the slide drops into receiving magazine 16, manipulation of the crank arm 3, elevates release 13 into position to again engage the succeeding slide used, and the operator pushes the slides along the way 2, by inserting another slide or by a movement of the hand.

With my device one operator controls the mechanism of the entire machine, obviating the necessity for the services of an assistant.

Having described my invention what I claim and desire to secure by Letters Patent is;—

A device of the character described, comprising a slide carrier, consisting of two parallel frames forming a sliding space for four slides end to end, and adapted to adjustment in the lens tube of a picture projecting device; a receiving magazine consisting of four upright posts and an inclined adjustable bottom slidably mounted between said posts and actuated by cord and pulley mechanism attached thereto; a slide release comprising an adjustable plate, provided with an arm and a pin thereon, and movably mounted on said slide carrier; a revoluble shaft provided at one end with a crank arm and at the other with a pulley and arm, adapted to coact with the bar in imparting motion to the mechanism, and loosely mounted on the slide carrier frame; a bar provided with a slot adapted to engage the pin on the arm of the slide release, and loosely connected with the arm of the revoluble shaft; and cord and pulley connections and means to actuate the mechanism, all substantially as and for the purposes set forth.

In testimony whereof I affix my signature in presence of two witnesses.

MATHEW A. GOODSPEED.

Witnesses:
ARTHUR TRUESDELL,
F. A. McGINNIS.